United States Patent
Nishigai

(10) Patent No.: US 12,218,532 B2
(45) Date of Patent: Feb. 4, 2025

(54) POWER STORAGE SYSTEM, CONTROL APPARATUS FOR POWER STORAGE APPARATUS, AND CONTROL METHOD FOR CONTROLLING SWITCHES CONNECTED TO THE POWER STORAGE APPARATUS

(71) Applicant: KYOCERA Corporation, Kyoto (JP)

(72) Inventor: Takanobu Nishigai, Hiratsuka (JP)

(73) Assignee: KYOCERA CORPORATION, Kyoto (JP)

( * ) Notice: Subject to any disclaimer, the term of this patent is extended or adjusted under 35 U.S.C. 154(b) by 596 days.

(21) Appl. No.: 17/285,093

(22) PCT Filed: Oct. 4, 2019

(86) PCT No.: PCT/JP2019/039392
§ 371 (c)(1),
(2) Date: Apr. 14, 2021

(87) PCT Pub. No.: WO2020/090349
PCT Pub. Date: May 7, 2020

(65) Prior Publication Data
US 2021/0351447 A1    Nov. 11, 2021

(30) Foreign Application Priority Data

Oct. 29, 2018  (JP) ................ 2018-203077

(51) Int. Cl.
*H02J 7/00*    (2006.01)
*H01M 10/44*   (2006.01)
*H01M 10/48*   (2006.01)

(52) U.S. Cl.
CPC ......... *H02J 7/0013* (2013.01); *H01M 10/441* (2013.01); *H01M 10/48* (2013.01);
(Continued)

(58) Field of Classification Search
CPC .. H01M 10/441; H01M 10/48; H01M 10/482; H02J 7/0013; H02J 7/0024; H02J 7/00712; H02J 7/007182
(Continued)

(56) References Cited

U.S. PATENT DOCUMENTS

| | | | |
|---|---|---|---|
| 8,415,923 B2 * | 4/2013 | Forsythe | H02J 7/0047 320/110 |
| 9,007,025 B2 * | 4/2015 | Miller | H02J 7/0018 320/112 |

(Continued)

FOREIGN PATENT DOCUMENTS

| | | | |
|---|---|---|---|
| CN | 108599281 A * | 9/2018 | H02J 7/0077 |
| EP | 1837944 A2 | 9/2007 | |

(Continued)

*Primary Examiner* — Richard Isla
*Assistant Examiner* — Manuel Hernandez
(74) *Attorney, Agent, or Firm* — HAUPTMAN HAM, LLP

(57) ABSTRACT

A power storage system includes a plurality of power storage apparatuses and a control apparatus. The plurality of power storage apparatuses are connected in parallel to each other via respective switches. The control apparatus controls the switches, based on respective voltage values of the plurality of power storage apparatuses and respective resistance values of conductive paths of the plurality of power storage apparatuses. The control apparatus charges or discharges at least one of the plurality of power storage apparatuses.

18 Claims, 4 Drawing Sheets

(52) U.S. Cl.
CPC ......... *H01M 10/482* (2013.01); *H02J 7/0024* (2013.01); *H02J 7/00712* (2020.01); *H02J 7/007182* (2020.01)

(58) Field of Classification Search
USPC .................................................. 320/118, 126
See application file for complete search history.

(56) References Cited

U.S. PATENT DOCUMENTS

| | | | |
|---|---|---|---|
| 10,778,013 B2* | 9/2020 | Kristjansson | H02J 7/0071 |
| 2004/0138785 A1 | 7/2004 | Emori et al. | |
| 2009/0066296 A1 | 3/2009 | Wang et al. | |
| 2009/0289604 A1* | 11/2009 | Carkner | H02J 7/0071 |
| | | | 320/160 |
| 2012/0217932 A1* | 8/2012 | Biebach | H01M 10/441 |
| | | | 320/126 |
| 2013/0335026 A1* | 12/2013 | Reynolds | H02J 7/0016 |
| | | | 320/112 |
| 2016/0254664 A1* | 9/2016 | Huang | H02J 7/0025 |
| | | | 307/52 |
| 2018/0219389 A1* | 8/2018 | Binder | G06F 1/26 |
| 2020/0044460 A1* | 2/2020 | Mikhaylik | H01M 10/486 |
| 2021/0135478 A1* | 5/2021 | Schline | G06F 1/3212 |

FOREIGN PATENT DOCUMENTS

| | | | |
|---|---|---|---|
| JP | 2001185228 A | | 7/2001 |
| JP | 2007166723 A | * | 6/2007 |
| WO | 2018140293 A1 | | 8/2018 |

\* cited by examiner

FIG. 2

| TIME | | T0 | T1 | T2 | T3 | T4 | T5 | T6 | T7 |
|---|---|---|---|---|---|---|---|---|---|
| CONTENTS OF CONTROL | | — | SWITCH ON POWER STORAGE APPARATUS 10A | SWITCH ON POWER STORAGE APPARATUS 10B | SWITCH OFF POWER STORAGE APPARATUS 10A | SWITCH ON POWER STORAGE APPARATUS 10C | SWITCH OFF POWER STORAGE APPARATUS 10B | SWITCH ON POWER STORAGE APPARATUSES 10A AND 10B | — |
| POWER STORAGE APPARATUS 10A ($R\_10A=1\Omega$) | VOLTMETER Vbat_10A | 200V | 200V | 193V | 185V | 185V | 185V | 185V | 185V |
| | AMMETER Ibat_10A | 0A | 15A | 7.5A | 0A | 0A | 0A | 5A | 5A |
| | SWITCH ON/OFF | OFF | OFF→ON | ON | ON→OFF | OFF | OFF | OFF→ON | ON |
| POWER STORAGE APPARATUS 10B ($R\_10B=3\Omega$) | VOLTMETER Vbat_10B | 208V | 208V | 208V | 200V | 197.5V | 195V | 195V | 195V |
| | AMMETER Ibat_10B | 0A | 0A | 7.5A | 15A | 7.5A | 0A | 5A | 5A |
| | SWITCH ON/OFF | OFF | OFF | OFF→ON | ON | ON | ON→OFF | OFF→ON | ON |
| POWER STORAGE APPARATUS 10C ($R\_10C=6\Omega$) | VOLTMETER Vbat_10C | 220V | 220V | 220V | 220V | 220V | 217.5V | 210V | 210V |
| | AMMETER Ibat_10C | 0A | 0A | 0A | 0A | 7.5A | 15A | 5A | 5A |
| | SWITCH ON/OFF | OFF | OFF | OFF | OFF | OFF→ON | ON | ON | ON |
| POWER CONTROL APPARATUS 20 | VOLTMETER Vpcs | 0V | 185V | 185.5V | 155V | 175V | 127.5V | 180V | 180V |
| | AMMETER Ipcs | 0A | 15A | 15A | 15A | 15A | 15A | 15A | 15A |

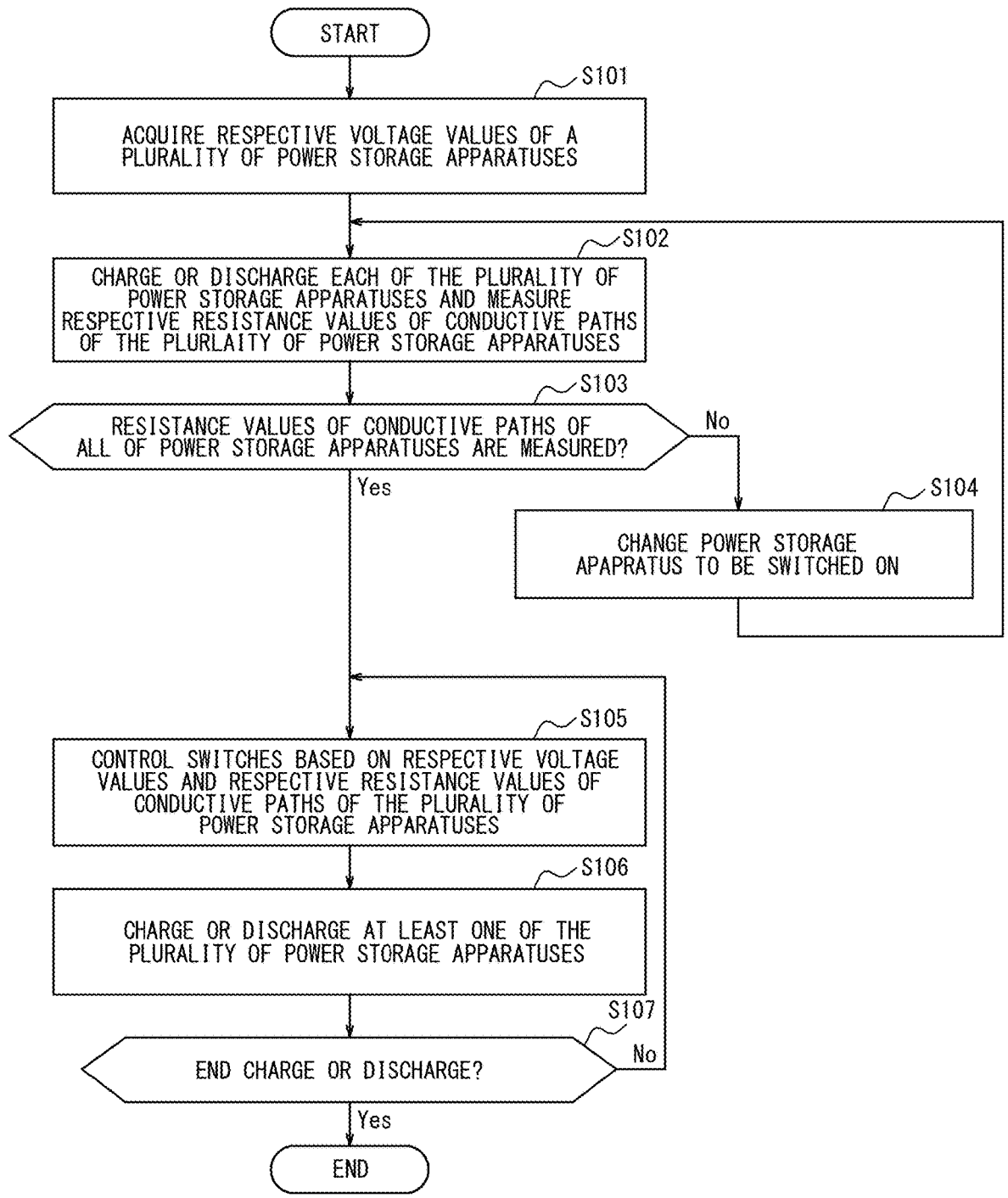

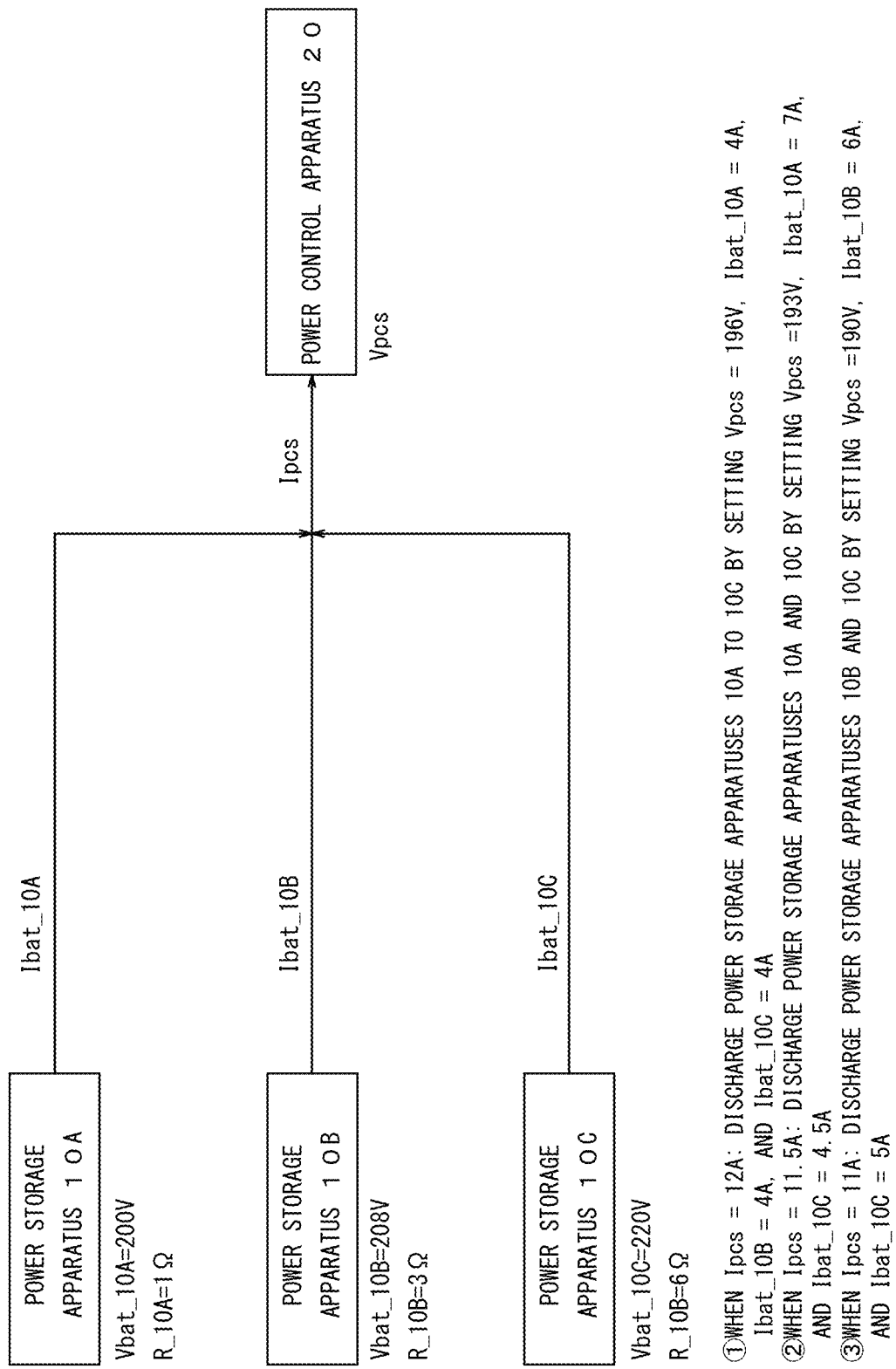

POWER STORAGE SYSTEM, CONTROL APPARATUS FOR POWER STORAGE APPARATUS, AND CONTROL METHOD FOR CONTROLLING SWITCHES CONNECTED TO THE POWER STORAGE APPARATUS

CROSS REFERENCE TO RELATED APPLICATION

This application is a National Phase of International Application Number PCT/JP2019/039392 filed Oct. 4, 2019, and claims priority to and the benefit of Japanese Patent Application No. 2018-203077 filed on Oct. 29, 2018, the entire contents of which are incorporated herein by reference.

TECHNICAL FIELD

The present disclosure relates to a power storage system, a control apparatus for a power storage apparatus, and a control method.

BACKGROUND

Conventionally, in a power storage system that includes a plurality of power storage apparatuses connected in parallel, a technique of charging or discharging the plurality of power storage apparatuses in consideration of a characteristic difference therebetween caused by aging deterioration or the like is known. For example, it is known a power supply apparatus that includes a plurality of power storage modules and is configured to turn off a switch of a power storage module and cut off a current of the power storage module in which a current flows in a direction opposite to a normal direction or in which a current imbalance is larger than a preset value.

SUMMARY

A power storage system according to an embodiment of the present disclosure includes a plurality of power storage apparatuses and a control apparatus. The plurality of power storage apparatuses are connected in parallel to each other via respective switches. The control apparatus controls the switches, based on respective voltage values of the plurality of power storage apparatuses and respective resistance values of conductive paths of the plurality of power storage apparatuses. The control apparatus charges or discharges at least one of the plurality of power storage apparatuses.

A control apparatus according to an embodiment of the present disclosure is a control apparatus for a plurality of power storage apparatuses. The plurality of power storage apparatuses are connected in parallel to each other via respective switches. The control apparatus controls the switches, based on respective voltage values of the plurality of power storage apparatuses and respective resistance values of conductive paths of the plurality of power storage apparatuses. The control apparatus charges or discharges at least one of the plurality of power storage apparatuses.

A control method according to an embodiment of the present disclosure is a control method for a plurality of power storage apparatuses. The plurality of power storage apparatuses are connected in parallel to each other via respective switches. The control method includes a step of controlling the switches, based on respective voltage values of the plurality of power storage apparatuses and respective resistance values of conductive paths of the plurality of power storage apparatuses. The control method includes a step of charging or discharging at least one of the plurality of power storage apparatuses.

BRIEF DESCRIPTION OF THE DRAWINGS

In the accompanying drawings:

FIG. 2 is a diagram illustrating a flow of an operation performed by the power storage system illustrated in FIG. 1;

FIG. 3 is a flow chart illustrating an example operation performed by a power control apparatus illustrated in FIG. 1; and FIG. 4 is a diagram illustrating another example operation performed by the power control apparatus illustrated in FIG. 1.

DETAILED DESCRIPTION

Figure 1:
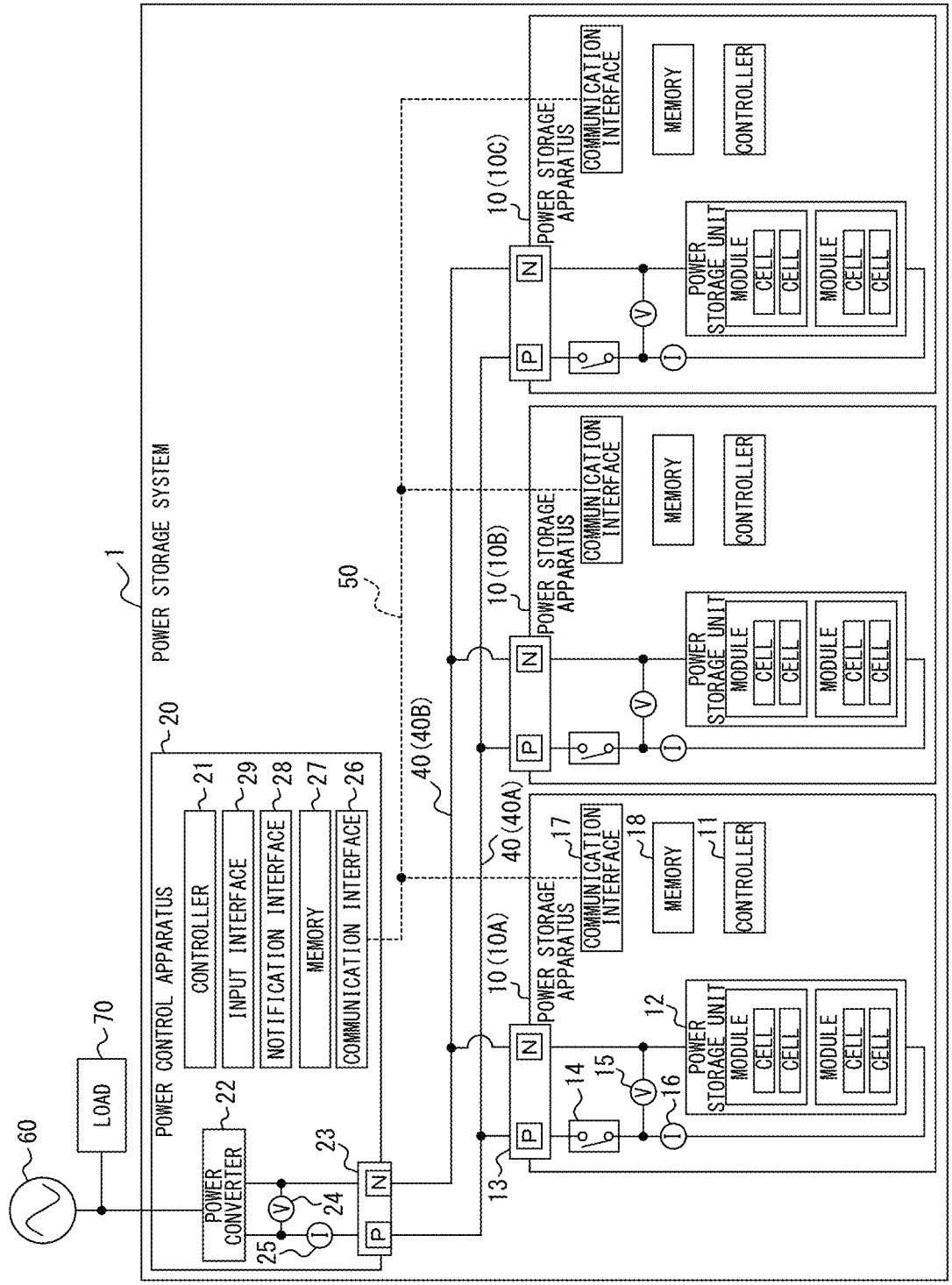
FIG. 1 is a schematic configuration diagram illustrating a power storage system according to an embodiment of the present disclosure.

Hereinafter, a power storage system that improves the usefulness of a technique of charging or discharging a plurality of power storage apparatuses connected in parallel, a control apparatus for the power storage apparatuses, and a control method will be disclosed. According to the power storage system, the control apparatus for the power storage apparatuses, and the control method according to an embodiment of the present disclosure, the usefulness of the technique of charging or discharging the plurality of power storage apparatuses connected in parallel is improved.

(Configuration of Power Storage System)

FIG. 1 is a schematic configuration diagram illustrating an example of a power storage system 1 according to the embodiment of the present disclosure. The power storage system 1 may include apparatuses such as a plurality of power storage apparatuses 10A, 10B, and 10C, and a power control apparatus 20. In FIG. 1, the plurality of power storage apparatuses 10A, 10B, and 10C are connected in parallel to the power control apparatus 20 via power lines 40. The power control apparatus 20 is connected to a power grid 60. The power lines 40 are indicated by solid lines in FIG. 1. The power storage system 1 selectively discharges electric power from the power storage apparatus 10A, 10B, or 10C to supply electric power to the power grid 60, a load 70, and the like. The load 70 is, for example, an electric apparatus such as a lighting or an air conditioner. The load 70 is not limited thereto and may be any electric apparatus that consumes electric power. Further, the power storage system 1 selectively charges the power storage apparatuses 10A, 10B, and 10C using electric power supplied from the power grid 60. Hereinafter, when the power storage apparatuses 10A, 10B, and 10C are not particularly distinguished from one another, they will be simply referred to as a power storage apparatus 10, collectively.

In the power storage system 1, the apparatuses included in the power storage system 1 such as the plurality of power storage apparatuses 10 and the power control apparatus 20 are communicably connected to each other via a communication line 50. The communication line 50 is indicated by a dotted line in FIG. 1. The communication line 50 may be a wired line, a wireless line, or both. Although the power storage system 1 includes three power storage apparatuses 10 and one power control apparatus 20 in FIG. 1 by way of example, the number and configuration of the apparatuses included in the power storage system 1 can be appropriately determined according to requirements such as a charging capacity, a discharging capacity, or the like.

The power storage apparatus 10 charges or discharges electric power. The power storage apparatus 10 may perform an operation including charging or discharging of electric power, based on the control by a control apparatus such as the power control apparatus 20. The power storage apparatus 10 may include any storage battery such as, for example, a lead storage battery, a nickel hydrogen storage battery, a lithium ion battery, a sodium sulfur battery, or a combination thereof.

The power control apparatus 20 is also referred to as a PCS (Power Conditioning System). The power control apparatus 20 is configured to convert DC power discharged from the power storage apparatus 10 into AC power or convert AC power supplied from the power grid 60 into DC power. The power control apparatus 20 may be used as a control apparatus for controlling charge and discharge of electric power by the power storage apparatus 10. In this case, the power control apparatus 20 may control charge and discharge of electric power by the plurality of power storage apparatuses 10, by turning on or off a switch of the power storage apparatus 10, as will be described later.

When the electric power is charged or discharged by the power storage apparatus 10, a portion of electric power to be charged or discharged is consumed by resistance of a conductive path of the power storage apparatus 10, whereby a voltage drop occurs. The resistance of the conductive path of the power storage apparatus 10 includes, for example, internal resistance of the power storage apparatus 10, wiring resistance of the power lines 40 connecting the power storage apparatus 10 and the power control apparatus 20, resistance of the switch included in the power storage apparatus 10, and the like. The resistance of the conductive path of the power storage apparatus 10 may have an impact on the control of the plurality of power storage apparatuses 10 included in the power storage system 1. For example, the resistance of the conductive path of the power storage apparatus 10 varies depending on a distance of an installation location of the power storage apparatus 10 from the power control apparatus 20, a degree of aging deterioration, or the like and can cause a characteristic difference in each operation of the power storage apparatus 10. Further, due to the voltage drop caused by the resistance of the conductive path of the power storage apparatus 10, an error may occur between a voltage value of the power storage apparatus 10 measured by a voltmeter or the like and an actual voltage value of the power storage apparatus 10. As a result, when the switch of the power storage apparatus 10 is controlled based on the measured voltage value, an unexpected inrush current, arc discharge, or the like may occur.

In the power storage system 1 according to the embodiment of the present disclosure, for example, the power control apparatus 20 serving as the control apparatus is configured to control charge and discharge by the plurality of power storage apparatuses 10, based on respective voltage values of the plurality of power storage apparatuses 10 and respective resistance values of the conductive paths of the plurality of power storage apparatuses 10. Thus, the power storage system 1 can efficiently charge and discharge the plurality of power storage apparatuses 10, in consideration of the characteristic difference between the power storage apparatuses 10 due to a difference in distances of installation locations, the degrees of aging deterioration, or the like. The power storage apparatus 10 and the power control apparatus 20 included in the power storage system 1 will be described below.

(Configuration of Power Storage Apparatus)

Hereinafter, a schematic configuration of the power storage apparatus 10 serving as an example of the power storage apparatus according to the embodiment of the present disclosure will be described. The power storage apparatus 10 includes a controller 11, a power storage unit 12, a terminal unit 13, a switch 14, a voltmeter 15, an ammeter 16, a communication interface 17, and a memory 18, as illustrated in FIG. 1.

The controller 11 includes one or more processors configured to provide control and processing ability for realizing each function of the power storage apparatus 10. The controller 11 may include a processor such as a CPU (Central Processing Unit) configured to execute a program defining a control procedure or a dedicated processor specialized in processing each function.

The controller 11 is connected to each function of the power storage apparatus 10 described above in a wired or wireless manner and configured to control and manage all or a part of the power storage apparatus 10 including the functional units. The controller 11 is configured to acquire a program stored in the memory 18 and execute the program to realize various functions associated with each function of the power storage apparatus 10. The control performed by the controller 11 characteristic of the present embodiment will be further described later.

The power storage unit 12 charges and discharges electric power, based on the control by the controller 11. The power storage unit 12 may include any storage battery such as, for example, a lead storage battery, a nickel hydrogen storage battery, a lithium ion battery, a sodium sulfur battery, or a combination thereof. The power storage unit 12 may be composed of one or more cells. The charge and discharge of electric power by the power storage unit 12 may be controlled and managed by the controller 11 in units of cells. Alternatively, charge and discharge of electric power by the power storage unit 12 may be controlled and managed by the controller 11 in units of modules in which a plurality of cells are connected. The number of cells and modules constituting the power storage unit 12 and the number of cells included in the module may be appropriately determined according to the application of the power storage apparatus 10 or the like.

A terminal unit 13 may include a positive electrode terminal and a negative electrode terminal. The positive electrode terminal and the negative electrode terminal are respectively represented by P and N in FIG. 1. The positive electrode terminal of the terminal unit 13 of the power storage apparatus 10A is connected to positive electrode terminals of the other power storage apparatuses 10B and 20C and the power control apparatus 20 via a power line 40A. The negative electrode terminal of the terminal unit 13 of the power storage apparatus 10A is connected to negative electrode terminals of the other power storage apparatuses 10B and 20C and the power control apparatus 20 via the power line 40B. In the power storage system 1, thus, the power storage apparatuses 10A, 10B, and 10C are connected in parallel to one another.

The switch 14 conductively connects or disconnects the terminal unit 13 and the power storage unit 12, based on the control by the controller 11. When the switch 14 is turned on, the power storage apparatus 10 may start charge or discharge by the power storage unit 12. Also, when the switch 14 is turned off, the power storage apparatus 10 may stop charge or discharge by the power storage unit 12. The switch 14 may include any switching element such as, for example, a transistor or a MOSFET. Although the switch 14 is arranged between the positive electrode terminal of the power storage unit 12 and the positive electrode terminal of the terminal unit 13 in FIG. 1, this is not restrictive. The switch 14 may be arranged at any location where the switch 14 can disconnect electric conduction between the power storage apparatus 10 and the power control apparatus 20.

The voltmeter 15 measures a voltage value of the power storage apparatus 10, based on the control by the controller 11. The voltage value of the power storage apparatus 10 may be a value of a so-called open end voltage in a sate in which the switch 14 is turned off. The voltage value of the power storage apparatus 10 may be a value of a discharge voltage from the power storage unit 12 during discharge by the power storage apparatus 10 before the voltage drops due to resistance of the conductive path. The voltage value of the power storage apparatus 10 may be a value of a charging voltage of the power storage unit 12 during charging by the power storage apparatus 10 after the voltage drops due to resistance of the conductive path. The voltmeter 15 may be any appropriate apparatus such as a voltmeter, a voltage sensor, or the like. The voltmeter 15 transmits a measured voltage value to the controller 11. Although the voltmeter 15 is arranged between the power storage unit 12 and the terminal unit 13 in FIG. 1, this is not restrictive. The voltmeter 15 may be arranged at any location where the voltmeter 15 can measure the voltage value of the power storage apparatus 10.

The ammeter 16 measures a current value of the power storage apparatus 10, based on the control by the controller 11. The ammeter 16 may be any apparatus including an ammeter or a current sensor. The ammeter 16 transmits a measured voltage value to the controller 11. Although the ammeter 16 is arranged between the positive electrode terminal of the power storage unit 12 and the positive electrode terminal of the terminal unit 13 in FIG. 1, this is not restrictive. The ammeter 16 may be arranged at any position where the ammeter 16 can measure the current value of the power storage apparatus 10. In the present disclosure, the current value of the power storage apparatus 10 will be described, provided that a direction in which a current flows when the power storage apparatus 10 discharges is defined as a positive direction. Thus, the current value of the power storage apparatus 10 takes a positive value during discharge by the power storage apparatus 10 and a negative value during charge by the power storage apparatus 10.

The communication interface 17 communicates with other apparatuses included in the power storage system 1, based on the control by the controller 11. The communication interface 17 may include, for example, a CAN (Controller Area Network) communication module, a wired LAN (Local Area Network) communication module, a wireless LAN communication module, or the like. In FIG. 1, the communication interface 17 of the power storage apparatus 10A is connected to the communication line 50 together with the power storage apparatus 10B and 10C included in the power storage system 1 and the power control apparatus 20. As a result, the power storage apparatus 10A can receive, for example, a control signal for controlling the power storage apparatus from another apparatus included in the power storage system 1 and operate based on the received control signal. The control signal includes, but is not limited to, an instruction for turning on or off the switch of the power storage apparatus, and an instruction for starting an operation such as charge or discharge by the power storage apparatus. To send and receive signals between the apparatuses connected to the communication line 50, the apparatuses including the power storage apparatuses 10 that are connected to the communication line 50 may be provided with information such as respective IDs (identifiers) that uniquely identify the apparatuses during communication.

The memory 18 includes, for example, a semiconductor memory, a magnetic memory, an optical memory, or the like. The memory 18 may function as, for example, a main storage apparatus or an auxiliary storage apparatus. The memory 18 may be a cache memory or the like of the processor included in the controller 11. The memory 18 may be a volatile storage apparatus or a non-volatile storage apparatus. The memory 18 stores information and programs used for control and processing for realizing each function of the power storage apparatus 10. The memory 18 may store information such as, for example, the IDs described above used for transmitting and receiving signals between apparatuses connected to the communication line 50. Further, the memory 18 may store conditions used for controlling the switch, which will be described later.

(Configuration of Power Control Apparatus)

Hereinafter, a schematic configuration of the power control apparatus 20 serving as an example of the power control apparatus according to the embodiment of the present disclosure will be described. The power control apparatus 20 includes a controller 21, a power converter 22, a terminal unit 23, a voltmeter 24, an ammeter 25, a communication interface 26, a memory 27, a notification interface 28, an input interface 29, and the like, as illustrated in FIG. 1.

The controller 21 includes one or more processors configured to provide control and processing ability for realizing each function of the power control apparatus 20, as will be described in detail later. The controller 21 may include a processor such as a CPU configured to execute a program defining a control procedure or a dedicated processor specialized in processing each function.

The controller 21 is connected to each function of the power control apparatus 20 described above in a wired or wireless manner and configured to control and manages all or a part of the power control apparatus 20 including the functional units. The controller 21 acquires a program stored in the memory 27 and executes the program, whereby the controller 21 realizes various functions associated with each function of the power control apparatus 20. The control characteristic of the present embodiment performed by the controller 21 when the power control apparatus 20 operates as a control apparatus for the plurality of power storage apparatuses 10 included in the power storage system 1 will be further described later.

The power converter 22 converts DC power into AC power or converts AC power into DC power, based on the control by the controller 21.

The terminal unit 23 may include a positive electrode terminal and a negative electrode terminal. In FIG. 1, the positive electrode terminal of the power control apparatus 20 is connected to respective positive electrode terminals of the plurality of power storage apparatuses 10 via the power line 40A, and the negative electrode terminal of the power control apparatus 20 is connected to respective negative electrode terminals of the plurality of power storage apparatuses 10 via the power line 40B.

The voltmeter 24 measures the voltage value of the power control apparatus 20, based on the control by the controller 21. The voltmeter 24 may be any apparatus including a voltmeter or a voltage sensor. A measured voltage value of the power control apparatus 20 may be used as a voltage value of charge or discharge by at least one of the power storage apparatuses 10 that includes the switch 14 being turned on and also is connected to the power control apparatus 20. In the present disclosure, the voltage value of the power control apparatus 20 is also referred to as a voltage value of charge or discharge by the plurality of power storage apparatuses 10. The voltmeter 24 transmits the measured voltage value to the controller 21. In FIG. 1, the voltmeter 24 is arranged between the power converter 22 and the terminal unit 23. However, the voltmeter 24 is not limited thereto and may be arranged at any position where the voltmeter 24 can measure the voltage value of charge or discharge by the plurality of power storage apparatuses 10.

The ammeter 25 measures the current value of the power control apparatus 20, based on the control by the controller 21. The ammeter 25 may be any apparatus including an ammeter or a current sensor. A measured current value of the power control apparatus 20 may be used as a total current value of charging or discharging by at least one of the power storage apparatuses 10 that includes the switch 14 being turned on and also is connected to the power control apparatus 20, from among the plurality of power storage apparatuses. In the present disclosure, the current value of the power control apparatus 20 will also be referred to as the total current value of charging or discharging by the plurality of power storage apparatuses 10. The ammeter 25 transmits the measured current value to the controller 21. In FIG. 1, the ammeter 25 is arranged between the positive electrode terminal of the power converter 22 and the positive electrode terminal of the terminal unit 23. However, the ammeter 25 is not limited thereto and may be arranged at any position where the ammeter 25 can measure the total current value of charging or discharging by the plurality of power storage apparatuses 10. Note that in the present disclosure the current value of the power control apparatus 20 will be described, provided that the direction in which the current flows when the power storage apparatus 10 discharges is defined as the positive direction. Thus, the current value of the power control apparatus 20 takes a positive value when the power storage apparatus 10 discharges and a negative value when the power storage apparatus 10 charges electric power.

The communication interface 26 communicates with other apparatus included in the power storage system 1, based on the control by the controller 21. The communication interface 26 may include, for example, a CAN communication module, a wired LAN communication module, a wireless LAN communication module, or the like. In FIG. 1, the communication interface 26 of the power control apparatus 20 is connected to the communication line 50 together with the plurality of power storage apparatuses 10 included in the power storage system 1. As a result, the power control apparatus 20 can transmit, for example, control signals for controlling the power storage apparatuses to the plurality of power storage apparatuses 10 included in the power storage system 1. The control signal includes, but is not limited to, an instruction for turning on or off the switch of the power storage apparatus, and an instruction for starting an operation such as charge or discharge by the power storage apparatus.

The memory 27 includes, for example, a semiconductor memory, a magnetic memory, an optical memory, or the like. The memory 27 may function as, for example, a main storage apparatus or an auxiliary storage apparatus. The memory 27 may be a cache memory or the like of the processor included in the controller 11. Further, the memory 27 may be a volatile storage apparatus or a non-volatile storage apparatus. The memory 27 stores the information and programs used for control and processing for realizing each function of the power storage apparatus 10. The memory 27 may store information such as, for example, the IDs for uniquely identifying the power storage apparatuses 10 included in the power storage system 1. Further, the memory 27 may store conditions used for controlling the plurality of power storage apparatuses 10 included in the power storage system 1, which will be described later.

The notification interface 28 notifies information by sound, a vibration, light, an image, or the like, based on the control by the controller 21. The notification interface 28 includes at least one of a speaker, an oscillator, a lamp, and a display apparatus. The notification interface 28 may notify information such as an on-state or an off-state of the switch 14 of the power storage apparatus 10, the voltage value of the power storage apparatus 10, and the resistance value of the conductive path of the power storage apparatus 10.

The input interface 29 receives an input operation from a user. The input interface 29 may include at least one of a mechanical key such as a power button, an input apparatus such as a touch panel, and a pointing device such as a mouse. When the input interface 29 detects the input operation performed by the user, the input interface 29 transmits the input operation as electronic information to the controller 21. The input operation may include, for example, an instruction to start charge or discharge by the plurality of power storage apparatuses 10, or an instruction to end charge or discharge by the plurality of power storage apparatuses 10. At least one of the notification interface 28 and the input interface 29 may be provided on, for example, a remote controller that is physically separated from the power control apparatus 20.

Hereinafter, an operation performed by the power control apparatus 20 when the power control apparatus 20 operates as a control apparatus for the plurality of power storage apparatuses 10 included in the power storage system 1 will be described.

The power control apparatus 20 acquires respective voltage values of the plurality of power storage apparatuses 10. The power control apparatus 20 may acquire the voltage value by, for example, communicating with each of the plurality of power storage apparatuses 10. In particular, the power control apparatus 20 may transmit a signal requesting transmission of a voltage value to each of the power storage apparatuses 10. Upon receiving the signal, the power storage apparatus 10 may transmit a signal including the voltage value measured by the voltmeter 15 of the power storage apparatus 10 to the power control apparatus 20. The power control apparatus 20 may store the voltage value included in the signal received from the power storage apparatus 10 as the voltage value of the power storage apparatus 10.

The power control apparatus 20 is not limited to the method described above and may acquire the respective voltage values of the plurality of power storage apparatuses 10 by any appropriate method. For example, the power control apparatus 20 may acquire the respective voltage values of the plurality of power storage apparatuses 10 from a battery management system (BMS) or a home energy management system (HEMS), which are configured to manage the plurality of power storage apparatuses 10.

The power control apparatus 20 acquires respective resistance values of the conductive paths of the plurality of power storage apparatuses 10. The power control apparatus 20 may measure the respective resistance values of the conductive paths of the plurality of power storage apparatuses 10 by causing charge or discharge by each of the plurality of power storage apparatuses 10. In particular, the power control apparatus 20 turns on the switch 14 of any one of the plurality of power storage apparatuses 10 to cause the power storage apparatus 10 to charge or discharge. The power control apparatus 20 measures a current value of the power storage apparatus 10 in which the switch 14 is turned on while the power storage apparatus 10 is charging or discharging, and also measures the voltage value of the power control apparatus 20. For example, the power control apparatus 20 may communicate with the power storage apparatus 10 in which the switch 14 is turned on and thus acquire the current value measured by the ammeter 16 of the power storage apparatus 10. Further, the power control apparatus 20 may measure the voltage value of the power control apparatus 20 using the voltmeter 24.

The power control apparatus 20 can calculate the resistance value of the conductive path of the power storage apparatus 10, using the measured voltage value of the power storage apparatus 10, the current value of the power storage apparatus 10, and the voltage value of the power control apparatus 20, based on the following equation (1):

$$R=(Vbat-Vpcs)/Ibat \quad (1)$$

Here, R is the resistance value of the conductive path of the power storage apparatus 10, and Vbat is the voltage value of the power storage apparatus 10. Ibat is the current value of the power storage apparatus 10, and Vpcs is the voltage value of the power control apparatus 20, i.e., the voltage value of charge or discharge by the plurality of power storage apparatuses 10.

After completion of the measurement of the resistance value of the conductive path of the power storage apparatus 10 in which the switch 14 is turned on, the power control apparatus 20 changes the power storage apparatus 10 in which the switch 14 is to be turned on, to a power storage apparatus 10 having the resistance value of the conductive path that has not been measured. When changing to the power storage apparatus 10 in which the switch 14 is to be turned on, the discharge or charge by the power storage system 1 may be interrupted. Thus, when a predetermined condition is satisfied, such as during nighttime or when the load 70 is receiving electric power from the power grid 60, the power control apparatus 20 may change the power storage apparatus 10 in which the switch 14 is to be turned on. As a result, a risk of affecting the operation of the load 70 or the like by measuring the resistance value of the conductive path can be reduced.

The power control apparatus 20 may repeat the above operation for all of the plurality of power storage apparatuses 10, until the measurement of the respective resistance values of the conductive paths of the power storage apparatuses 10 is completed. The power control apparatus 20 may store the respective resistance values of the conductive paths calculated by controlling the power storage apparatuses 10 as the respective resistance values of the conductive paths of the power storage apparatuses 10.

An order of the power storage apparatuses 10 to measure the resistance values of the conductive paths may be determined by the power control apparatus 20 in any manner. For example, the power control apparatus 20 may sequentially measure the resistance value from the largest voltage value of the power storage apparatus 10. As a result, the possibly to affect the operation of the load 70 or the like due to a situation in which one of the power storage apparatuses 10 falls out of charge while discharging electric power for the measurement of the resistance value of the conductive path can be reduced.

The power control apparatus 20 may measure the resistance values of the conductive paths of the power storage apparatuses 10 at predetermined timings. Wiring resistance and internal resistance vary depending on ambient temperature, aging deterioration, and the like. Thus, the power control apparatus 20 may measure the resistance values of the conductive paths of the power storage apparatuses 10 at predetermined intervals, or when the ambient temperature changes by a predetermined amount or more, and update the information stored in the memory 27. Alternatively, when a new power storage apparatus 10 is installed as a replacement or as an addition, the power control apparatus 20 may measure a resistance value of a conductive path of the new power storage apparatus 10 and store the resistance value in the memory 27.

Hereinafter, an operation performed by the power control apparatus 20 serving as the control apparatus to cause charge or discharge by the plurality of power storage apparatuses 10, based on the respective voltage values of the plurality of power storage apparatuses 10 and the respective resistance values of conductive paths of the plurality of power storage apparatuses 10 acquired in the above manner will be described.

The power control apparatus 20 causes charge or discharge by at least one power storage apparatus 10, from among the plurality of power storage apparatuses 10. The power control apparatus 20 may cause charge or discharge by at least one power storage apparatus 10, from among the plurality of power storage apparatuses 10, by, for example, controlling the switch 14 such that the current value of the power control apparatus 20 becomes constant.

The power control apparatus 20 may control the switch 14 to cause charge or discharge by at least one power storage apparatus 10, from among the plurality of power storage apparatuses 10, in a manner to not interrupt charge or discharge by the plurality of power storage apparatuses 10.

The power control apparatus 20 may control the switch 14 to preferentially charge or discharge the power storage apparatus 10 having a smaller resistance value of the conductive path, from among the plurality of power storage apparatuses 10. For example, when the power control apparatus 20 starts charge or discharge by the plurality of power storage apparatuses 10, the power control apparatus 20 may turn on the switch 14 of the power storage apparatus 10 having the smallest resistance value of the conductive path, from among the plurality of power storage apparatuses 10.

The power control apparatus 20 controls the switch 14, based on the respective voltage values of the plurality of power storage apparatuses 10 and the respective resistance values of the conductive paths of the plurality of power storage apparatuses 10. In particular, when the power storage system 1 includes N-number (N is any integer) of the power storage apparatuses 10, the power control apparatus 20 may calculate a combination of n-number of the power storage apparatuses 10 that substantially satisfies the following equations (2) and (3):

$$Vpcs=Vbat_1-R_1*Ibat_1=Vbat_2-R_2*Ibat_2=\ldots =Vbat_n-R_n*Ibat_n \quad (2)$$

$$Ipcs=Ibat_1+Ibat_2+\ldots+Ibat_n \quad (3)$$

Here, n is any integer between 1 and N. Vbat 1 to $Vbat_n$ are respective voltage values of the n-number of the power storage apparatuses 10, and $Ibat_1$ to $Ibat_n$ are respective current values of the n-number of the power storage apparatuses 10. $R_1$ to $R_n$ are respective resistance values of the conductive paths of the n-number of the power storage apparatuses 10, and Vpcs is the voltage value of the power control apparatus 20, i.e., the voltage value of charge or discharge by the plurality of power storage apparatuses 10.

Ipcs is the current value of the power control apparatus 20, i.e., the total current value of charge or discharge by the plurality of power storage apparatuses 10. In the present disclosure, the combination of the power storage apparatuses 10 includes at least one power storage apparatus 10 selected from the plurality of power storage apparatuses 10.

In the present disclosure, "substantially satisfying" an equation is not limited to strictly satisfying the equation but means to satisfy the equation within a predetermined error range, without affecting the operations of the power storage system 1, the power storage apparatus 10, and the power control apparatus 20. Similarly, "substantially equal" to a value is not limited to be exactly equal to the value but means to be equivalent to the value within a predetermined error range, without affecting the operations of the power storage system 1, the power storage apparatus 10, and the power control apparatus 20.

The power control apparatus 20 controls the switch 14 in a state in which the n-number of the power storage apparatuses 10 included in the calculated combination of the power storage apparatuses 10 substantially satisfies the equations (2) and (3). For example, the power control apparatus 20 may turn on the switch 14 of at least one of the power storage apparatuses 10, from among the n-number of the power storage apparatus 10 in which the switch 14 is OFF, to start charge or discharge, in a state in which the n-number of the power storage apparatuses 10 substantially satisfy the equations (2) and (3). Further, for example, the power control apparatus 20 may turn off the switch 14 of at least one of the power storage apparatuses 10, from among the n-number of the power storage apparatuses 10 in which the switch 14 is ON, to start charge or discharge, in a state in which the n-number of the power storage apparatuses 10 substantially satisfy the equations (2) and (3).

The power control apparatus 20 may calculate the combination of the power storage apparatuses 10 that substantially satisfies the equations (2) and (3) described above at a predetermined timing during charge or discharge by the plurality of power storage apparatuses 10. The predetermined timing may be predetermined intervals. Alternatively, the predetermined timing may be a timing at which the voltage value of the power control apparatus 20 or the current value of the power control apparatus 20 changes. The power control apparatus 20 controls the switch 14 in a state in which the power storage apparatus 10 included in the calculated combination of the power storage apparatuses 10 substantially satisfies the equations (2) and (3). Thus, the power control apparatus 20 may charge or discharge at least one of the power storage apparatuses 10, from among the plurality of power storage apparatuses 10, in a manner to not interrupt charge or discharge by the plurality of power storage apparatuses 10.

Further, for example, the power control apparatus 20 may control the switch 14 such that the current values of the power storage apparatuses 10 to be charged and discharged are substantially equal to each other. In particular, the power control apparatus 20 may calculate a combination of n-number of the power storage apparatuses 10 that substantially satisfies an equation (4) set forth below, in addition to the equations (2) and (3) set forth above, from among the N-number of the power storage apparatuses 10 included in the power storage system 1.

$$Ibat_1 = Ibat_2 = \ldots = Ibat_n \quad (4)$$

Here, n is any integer between 1 and N, and $Ibat_1$ to $Ibat_n$ are respective current values of the n-number of the power storage apparatuses 10.

The power control apparatus 20 controls the switch 14 in a state in which the n-number of the power storage apparatuses 10 included in the calculated combination of the power storage apparatuses 10 substantially satisfy the equations (2), (3) and (4). For example, in the state in which the n-number of the power storage apparatuses 10 substantially satisfy the equations (2), (3) and (4), the power control apparatus 20 may turn on the switch 14 of at least one of the n-number of the power storage apparatuses 10 which is OFF, to start charge or discharge. For example, in the state in which the n-number of the power storage apparatuses 10 substantially satisfy the equations (2), (3) and (4), the power control apparatus 20 may turn off the switch 14 of at least one of the n-number of the power storage apparatuses 10 which is ON, to stop charge or discharge.

The power control apparatus 20 may control the switch 14 to cause charge or discharge by at least one of the plurality of power storage apparatuses 10, based on the respective voltage values of the plurality of power storage apparatuses 10 and the respective resistance values of the conductive paths of the plurality of power storage apparatuses 10, such that charge or discharge by the plurality of power storage apparatuses 10 are not interrupted and, simultaneously, all the current values of the plurality of power storage apparatuses 10 become substantially equal to each other. In particular, the power control apparatus 20 may control the switch 14 such that all of the N-number of the power storage apparatuses 10 included in the power storage system 1 substantially satisfy equations (5), (6), and (7) set forth below. The power control apparatus 20 may repeatedly control the switch 14 in a state in which n-number of the power storage apparatuses 10, from among the N-number of the power storage apparatuses 10, substantially satisfy the equations (2), (3), and (4), until all of the N-number of the power storage apparatuses 10 substantially satisfy the equations (5), (6), and (7).

$$Vpcs = Vbat_1 - R_1 * Ibat_1 = Vbat_2 - R_2 * Ibat_2 = \ldots = Vbat_N - R_N * Ibat_N \quad (5)$$

$$Ipcs = Ibat_1 + Ibat_2 + \ldots + Ibat_N \quad (6)$$

$$Ibat_1 = Ibat_2 = \ldots = Ibat_N \quad (7)$$

Here, N is any integer, and $Vbat_1$ to $Vbat_N$ are respective voltage values of the N-number of the power storage apparatuses 10. $Ibat_1$ to $Ibat_N$ are respective current values of the N-number of the power storage apparatuses 10, and $R_1$ to $R_N$ are respective resistance values of the conductive paths of the N-number of the power storage apparatuses 10. Vpcs is the voltage value of the power control apparatus 20, i.e., the voltage value of charge or discharge by the plurality of power storage apparatuses 10, and Ipcs is the current value of the power control apparatus 20, that is, the total current value of charge or discharge by the plurality of power storage apparatuses 10.

(Example Operation of Power Storage System)

Hereinafter, an example of control of the power storage apparatus 10 executed by the power storage system 1 according to the embodiment of the present disclosure will be described. The power storage system 1 includes the power storage apparatuses 10A, 10B, and 10C, and the power control apparatus 20, as illustrated in FIG. 1. The power storage apparatuses 10A, 10B, and 10C are connected in parallel to one another. In the power storage system 1, the power control apparatus 20 operates as a control apparatus for the power storage apparatuses 10A, 10B, and 10C.

The power control apparatus 20 acquires respective voltage values of the power storage apparatuses 10A, 10B, and 10C, and respective resistance values of the conductive paths of the power storage apparatuses 10A, 10B, and 10C. The power control apparatus 20 communicates with the power storage apparatuses 10A, 10B, and 10C and acquires the respective voltage values thereof. It is assumed that, as a result of communication, a voltage value Vbat_ 10A of the power storage apparatus 10A, a voltage value Vbat_10B of the power storage apparatus 10B, and a voltage value Vbat_10C of the power storage apparatus 10C are respectively 200 V, 208 V, and 220 V, by way of example. The power control apparatus 20 charges or discharges one of the power storage apparatuses 10C, 10B, and 10A having the largest voltage value and measures the resistance value of the conductive path of the corresponding power storage apparatus 10. It is assumed that, as a result of the measurement, a resistance value R_10A of the conductive path of the power storage apparatus 10A, a resistance value R_10B of the conductive path of the power storage apparatus 10B, and a resistance value R_10C of the conductive path of the power storage apparatus 10C are respectively 1 Ω, 3 Ω, and 6 Ω, by way of example.

A flow of control performed by the power control apparatus 20 for discharge by the plurality of power storage apparatuses 10A, 10B, and 10C, based on the respective voltage values of the power storage apparatuses 10A, 10B, and 10C and the respective resistance values of the conductive paths of the power storage apparatuses 10A, 10B, and 10C will be described with reference to FIG. 2. FIG. 2 illustrates the respective on/off states of the switches 14 of the power storage apparatuses 10A, 10B, and 10C, the respective values of the voltmeter 15, the respective values of the ammeter 16, the values of the voltmeter 24 of the power control apparatus 20, and the values of the ammeter 25, at a plurality of different time points. It is assumed that the power storage apparatuses 10A, 10B, and 10C are switched off at a time point T0.

It is assumed that at a time T1 the power control apparatus 20 receives an instruction to discharge the power storage apparatus 10A, 10B, and 10C such that the total current value thereof becomes 15A. In this case, the power control apparatus 20 turns on the power storage apparatus 10A having the smallest resistance value of the conductive path, from among the power storage apparatuses 10A, 10B, and 10C, and starts discharging. As a result, the power storage apparatus 10A discharges at the current value of 15 A after the time point T1.

When the discharge by the power storage apparatus 10A proceeds and the voltage of the power storage apparatus 10A drops to 193 V at a time point T2, the power control apparatus 20 determines that the power storage apparatus 10A and the power storage apparatus 10B substantially satisfy the equations (2), (3), and (4) set forth above. As a result, the power control apparatus 20 determines that the power storage apparatus 10B can be switched on. The power control apparatus 20 switches on the power storage apparatus 10B at the time point T2. As a result, the power storage apparatuses 10A and 10B discharge at the respective current values of 7.5 A after the time point T2.

The power control apparatus 20 discharges the power storage apparatus 10A and the power storage apparatus 10B and, by a time point T3, the voltage of the power storage apparatus 10A drops from the 193 V set forth above to 185 V. Similarly, the voltage of the power storage apparatus 10B drops from 208 V to 200 V. The power control apparatus 20 switches off the power storage apparatus 10A at the time point T3. As a result, the power storage apparatus 10B discharges at the current value of 15 A after the time point T3.

When the discharge by the power storage apparatus 10B progresses and the voltage of the power storage apparatus 10B reaches 197.5 V at a time point T4, the power control apparatus 20 determines that the power storage apparatuses 10B and 10C satisfy the equations (2), (3), and (4) set forth above and that the storage apparatus 10C can be switched on. The power control apparatus 20 switches on the power storage apparatus 10C at the time point T4. As a result, the power storage apparatus 10B and 10C discharge at the respective current values of 7.5 A after the time point T4.

The power control apparatus 20 discharges the power storage apparatuses 10B and 10C, whereby the voltage of the power storage apparatus 10B drops from 197.5 V set forth above to 195 V by a time point T5. Similarly, the voltage of the power storage apparatus 10C drops from 220 V to 217.5 V. The power control apparatus 20 switches off the power storage apparatus 10B at the time point T5. As a result, the power storage apparatus 10C discharges at the current value of 15 A after the time point T5.

The power control apparatus 20 discharges the power storage apparatus 10C and, when the voltage of the power storage apparatus 10C reaches 210 V set forth above at a time point T6, determines that the power storage apparatuses 10A, 10B, and 10C substantially satisfy the equations (2), (3), and (4) set forth above. In this case, the power control apparatus 20 determines that the power storage apparatuses 10A and 10B can be switched on. The power control apparatus 20 switches on the power storage apparatuses 10A and 10B at the time point T6. As a result, the power storage apparatuses 10A, 10B, and 10C discharge at the respective current values of 5 A after the time point T6, in a manner substantially satisfying the equations (5), (6), and (7). As described above, the power control apparatus 20 may control the power storage apparatuses 10A, 10B and 10C such that discharge by them is not interrupted and, simultaneously, the respective current values of the power storage apparatus 10A, 10B and 10C become substantially equal to one another.

(Example Operation of Power Control Apparatus)

An example operation performed by the power control apparatus 20 serving as the control apparatus according to the embodiment of the present disclosure will be described with reference to FIG. 3. Note that this operation is described to be started in a state in which all of the switches 14 of the plurality of power storage apparatuses 10 are OFF.

Step S101: The controller 21 acquires the respective voltage values of the plurality of power storage apparatuses 10. The controller 21 may communicate with the power storage apparatuses 10 and acquire the respective voltage values measured by the respective voltmeters 15 of the power storage apparatuses 10.

Step S102: The controller 21 discharges or charges each of the plurality of power storage apparatuses 10 and measures the respective resistance values of the conductive paths of the plurality of power storage apparatuses 10. The controller 21 may turn on the switch 14 of the power storage apparatus 10 having the largest voltage value, from among the plurality of power storage apparatuses 10.

Step S103: The controller 21 determines whether the respective resistance values of the conductive paths of all of the power storage apparatuses 10 have been measured.

Step S104: In a case in which the respective resistance values of the conductive paths of all of the power storage apparatuses 10 have not been measured (No at step S103), the controller 21 changes the power storage apparatus 10 in which the switch 14 is to be turned on. Then, the controller 21 repeats the process from step S102.

Step S105: In a case in which the respective resistance values of the conductive paths of all of the power storage apparatuses 10 have been measured (Yes at step S103), the controller 21 controls the switch 14, based on the respective voltage values of the plurality of power storage apparatuses 10 and the respective resistance values of the conductive paths of the plurality of power storage apparatuses 10.

Step S106: The controller 21 charges or discharges at least one of the plurality of power storage apparatuses 10 in a manner to not interrupt the charging or discharging by the plurality of power storage apparatuses 10.

Step S107: The controller 21 determines whether to end charge or discharge by the plurality of power storage apparatuses 10. When the controller 21 determines to end charge or discharge by the plurality of power storage apparatuses 10 (Yes at step S107), the controller 21 ends this operation. When the controller 21 determines to continue charge or discharge by the plurality of power storage apparatuses 10 (No at step S107), the controller 21 repeats the process from step S105.

Hereinafter, another example operation performed by the power control apparatus 20 to charge or discharge the plurality of power storage apparatuses 10, based on the respective voltage values of the plurality of power storage apparatuses 10 and the respective resistance values of the conductive paths of the plurality of power storage apparatuses 10 will be described.

For example, the power control apparatus 20 may control the switch 14 in a manner to reduce the total loss due to the resistances of the conductive paths of the plurality of power storage apparatuses 10. The power control apparatus 20 calculates a combination of n-number of the power storage apparatuses 10 that substantially satisfies the equations (2) and (3), from among from the N-number of the power storage apparatuses 10 included in the power storage system 1. At this time, the power control apparatus 20 can evaluate the total loss due to the resistance of the conductive paths of the power storage apparatuses 10 included in all possible combinations of the n-numbers of the power storage apparatuses 10 and adopt a combination having the smallest total loss. The total loss due to the resistance of the conductive paths of the plurality of power storage apparatuses 10 may be expressed by the following polynomial (8):

$$Ibat_1^2 R_1 + Ibat_2^2 R_2 + \ldots + Ibat_n^2 R_n \text{ polynomial} \tag{8}$$

Here, n is any integer between 1 and N, and $Ibat_1$ to $Ibat^N$ are the respective current values of the N-number of the power storage apparatuses 10. $R_1$ to $R_N$ are the respective resistance values of the conductive paths of the N-number of the power storage apparatuses 10. The power control apparatus 20 may control the switch 14 in a state in which the n-number of the power storage apparatuses 10 included in the adopted combination of the power storage apparatuses 10 substantially satisfy the equations (2) and (3) and continue charge or discharge by the plurality of power storage apparatuses 10.

Further, for example, the power control apparatus 20 may control the switch 14 such that the total loss due to the resistance of the conductive paths of the plurality of power storage apparatuses 10 becomes equal to or less than a predetermined threshold value. The power control apparatus 20 calculates a combination of n-number of the power storage apparatuses 10 that substantially satisfies the equations (2) and (3), from among the N-number of the power storage apparatuses 10 included in the power storage system 1. At this time, the power control apparatus 20 may set the predetermined threshold value in advance and sequentially evaluate the total loss due to the resistance of the conductive paths of the power storage apparatuses 10 included in the combination of the n-number of the power storage apparatuses 10, until the power control apparatus 20 finds a combination of the power storage apparatuses 10 having the total loss equal to or lower than the threshold value. When the power control apparatus 20 finds the combination of the power storage apparatuses 10 in which the total loss due to the resistance of the conductive paths is equal to or less than the predetermined threshold value, the power control apparatus 20 may adopt the combination of the power storage apparatuses 10. The power control apparatus 20 may control the switch 14 in a state in which the n-number of the power storage apparatuses 10 included in the adopted combination of the power storage apparatuses 10 substantially satisfy the equations (2) and (3) and continue charge or discharge by the plurality of power storage apparatuses.

Hereinafter, an example control of the power storage apparatus 10 performed by the power control apparatus 20 will be described with reference to FIG. 1 and FIG. 4. The power storage system 1 includes the power storage apparatus 10A, 10B, 10C, and the power control apparatus 20, as illustrated in FIG. 1. The power storage apparatus 10A, 10B, and 10C are connected in parallel to one another. In the power storage system 1, the power control apparatus 20 operates as the control apparatus for the power storage apparatuses 10A, 10B, and 10C.

As illustrated in FIG. 4, it is assumed that, as a result of acquiring the respective voltage values of the power storage apparatuses 10A, 10B, and 10C and the respective resistance values of the conductive paths of the power storage apparatuses 10A, 10B, and 10C by the power control apparatus 20, the voltage value Vbat_10A of the power storage apparatus 10A, the voltage value Vbat_10B of the power storage apparatus 10B, and the voltage value Vbat_10C of the power storage apparatus 10C are respectively 200 V, 208 V, and 220 V, by way of example. Further, it is also assumed that the resistance value R_10A of the conductive path of the power storage apparatus 10A, the resistance value R_10B of the conductive path of the power storage apparatus 10B, and the resistance value R_10C of the conductive path of the power storage apparatus 10C are respectively 1 Ω, 3 Ω, and 6 Ω.

It is assumed that the power control apparatus 20 receives an instruction to perform discharge such that the total current value of the power storage apparatuses 10A, 10B, and 10C becomes 12 A. The power control apparatus 20 calculates a total loss due to the resistance of the conductive path of each of the combinations of the power storage apparatuses that satisfies the equations (2) and (3) when Ipcs is 12A, based on the respective voltage values of the power storage apparatus 10A, 10B, and 10C and the respective resistance values of the conductive paths of the power storage apparatus 10A, 10B, and 10C. As a result, the power control apparatus 20 may discharge all of the power storage apparatuses 10A, 10B, and 10C, by setting Vpcs to 196 V and setting Ibat_10A, Ibat_10B, and Ibat_10C to 4A. In a case in which the power control apparatus 20 receives an instruction to discharge such that the total current value of the power storage apparatuses 10A, 10B, and 10C becomes 11.5 A, the power control apparatus 20 may discharge the power storage apparatuses 10A and 10C by setting Vpcs to 193 V, Ibat_10A to 7 A, and Ibat_10C to 4.5 A. Further, in a case in which the power control apparatus 20 receives an instruction to discharge such that the total current value of the power storage apparatuses 10A, 10B, and 10C becomes 11 A, the power control apparatus 20 may discharge the power storage apparatuses 10B and 10C by setting Vpcs to 190 V, Ibat_10B to 6 A, and Ibat_10C to 5 A.

As described above, the power storage system 1 according to the present embodiment includes the plurality of power storage apparatuses 10 and a control apparatus constituted of the power control apparatus 20 or the like. The plurality of power storage apparatuses 10 are connected in parallel to one another via the switch 14. The control apparatus is configured to control the switch 14, based on the respective voltage values of the plurality of power storage apparatuses 10 and the respective resistance values of the conductive paths of the plurality of power storage apparatuses 10. The control apparatus charges or discharges at least one of the plurality of power storage apparatuses 10. The control apparatus having the above configuration selects the power storage apparatus 10 to charge or discharge, based on the voltage value of the power storage apparatus 10 and the resistance value of the conductive path of the power storage apparatus 10. As a result, the power storage system 1 can charge or discharge the plurality of power storage apparatuses 10 in consideration of characteristic differences between the power storage apparatuses 10 due to the difference in the distances of installation locations and the degree of aging deterioration, whereby the usefulness of the technique of connecting apparatuses in parallel to charge or discharge is improved. Further, the power storage system 1 takes the resistance value of the conductive path of the power storage apparatus 10 into consideration and thus can reduce the probability of occurrence of an inrush current, arc discharge, or the like when controlling the switch of the power storage apparatus 10.

Further, in a case in which the power storage apparatus 10 is newly connected in parallel to another power storage apparatus 10 that is charging or discharging, based on the voltage value alone of the power storage apparatus 10 measured by the voltmeter or the like, even although the measured voltage value is approximately equal to that of another power storage apparatus, the power storage apparatus 10 that is newly connected may not immediately charge or discharge. In this case, bias charge by the power storage apparatus 10 that is charging or discharging occurs, inhibiting effective charge or discharge by the power storage apparatus 10 that is newly connected. According to the power storage system 1 of the present embodiment, a difference between the measured voltage value and the actual voltage value of the power storage apparatus 10 originating from the resistance value of the conductive path of the power storage apparatus 10 can be reduced. Thus, a predetermined current can be taken out from the power storage apparatus 10 that is newly connected in parallel, and this power storage apparatus 10 can be effectively used immediately after the connection.

As described above, the control apparatus such as the power control apparatus 20 included in the power storage system 1 according to the present embodiment is configured to control the switch 14 such that the power storage apparatus 10 having a small resistance value of the conductive path, from among the plurality of power storage apparatuses 10, preferentially charges or discharges. The power storage system 1 configured as described above can reduce the probability of occurrence of a loss due to the resistance of the conductive path of the power storage apparatus 10 caused by charge or discharge.

As described above, the control apparatus such as the power control apparatus 20 included in the power storage system 1 according to the present embodiment controls the switch 14 such that the respective current values of the power storage apparatuses 10 to charge or discharge are substantially equal to one another. Since the power storage system 1 configured as described above can reduce the bias of the currents to be input or output to the plurality of power storage apparatuses 10, the probability to deteriorate a particular one of the power storage apparatuses is reduced.

As described above, the control apparatus such as the power control apparatus 20 included in the power storage system 1 according to the present embodiment is configured to control the switch 14 to reduce the total loss due to the resistance of the conductive paths of the plurality of power storage apparatuses 10. The power storage system 1 configured as described above can reduce the probability of occurrence of a loss due to the resistance of the conductive paths of the power storage apparatuses 10 caused by charge or discharge.

As described above, the control apparatus such as the power control apparatus 20 included in the power storage system 1 according to the present embodiment is configured to control the switch 14 such that the total loss due to the resistance of the conductive paths of the plurality of power storage apparatuses 10 is equal to or less than the predetermined threshold value. The power storage system 1 configured as described above can end the evaluation at the point when a reasonable combination of the power storage apparatuses 10 is found before performing the evaluation of the loss during charging or discharging caused by all combinations of the power storage apparatuses 10. Thus, an amount to be calculated by the control apparatus and an amount of data to be stored can be reduced.

As described above, the control apparatus such as the power control apparatus 20 included in the power storage system 1 according to the present embodiment is configured to charge or discharge each of the plurality of power storage apparatuses 10 and measure the respective resistance values of the conductive paths of the plurality of power storage apparatuses 10. According to this configuration, the control apparatus selects the power storage apparatus 10 to charge or discharge, based on the voltage value of the power storage apparatus 10 and the resistance value of the conductive path of the power storage apparatus 10. As a result, the power storage system 1 can charge or discharge the plurality of power storage apparatuses 10 in consideration of the characteristic difference therebetween due to the difference in the distances of installation locations and the degree of aging deterioration, whereby the usefulness of the technique of connecting a plurality of apparatuses in parallel to charge or discharge is improved.

Although the above embodiments have been described as typical examples, it will be apparent to those skilled in the art that many modifications and substitutions can be implemented within the spirit and scope of the present disclosure.

Accordingly, the present disclosure should not be construed as being limited by the aforementioned embodiments, and various modifications or changes can be implemented without departing from the scope of the claims. For example, the functions included in each of the means or steps may be rearranged avoiding a logical inconsistency, such that a plurality of means or steps are combined, or one means or step is subdivided.

For example, although in the above embodiments the power control apparatus 20 has been described to operate as the control apparatus, this is not restrictive. The control apparatus may be provided separately from the power control apparatus 20. For example, the control apparatus may be included in a battery management system for controlling and managing the plurality of power storage apparatuses 10. Alternatively, the control apparatus may be included in a home energy management system or the like. The control apparatus may be provided separately from the power control apparatus 20. In this case, a part or all of the operation that has been described above to be performed by the power control apparatus 20 may be realized by the control apparatus.

Further, for example, although in the above embodiments an example in which the power storage apparatuses 10 include the respective switches 14 is illustrated, this is not restrictive. For example, the switches 14 may be provided separately from the plurality of power storage apparatuses 10. In this case, the control apparatus may be communicably connected to the switches 14.

Further, for example, although in the above embodiments an example in which the power control apparatus 20 calculates the respective resistance values of the conductive paths of the plurality of the power storage apparatuses 10, based on the measured voltage values and current values of the power storage apparatuses 10 is illustrated, this is not restrictive. For example, the power control apparatus 20 may store the respective resistance values of the conductive paths of the power storage apparatuses 10, in advance. In a case in which, for example, respective resistance of the elements such as the power line 40 constituting the conductive path, the power storage unit 12, the terminal unit 23, the terminal unit 13, the switch 14, the ammeter 16, the ammeter 25, and the power converter 22 are recorded or stored in advance, the power control apparatus 20 may calculate or estimate the resistance value of the conductive path, based on some or all of the values. In a case in which the voltage value and the current value of the power storage apparatus 10 have not been measured, the power control apparatus 20 may perform the operation described above using the resistance value of the conductive path of the power storage apparatus 10 that has been stored in advance.

The invention claimed is:

1. A control method for a plurality of power storage apparatuses connected in parallel to each other via respective switches, the control method comprising:
controlling the switches,
wherein the controlling the switches includes:
in response to receiving an instruction to charge or discharge the plurality of power storage apparatuses, based on respective voltage values of the plurality of power storage apparatuses and respective resistance values of conductive paths of the plurality of power storage apparatuses, only turn on a switch of at least one of the plurality of power storage apparatuses having a conductive path with a smallest resistance value to start charging or discharging the at least one of the plurality of power storage apparatuses.

2. The control method according to claim 1, wherein the controlling the switches includes controlling the switches, based on the respective voltage values of the plurality of power storage apparatuses and the respective resistance values of the conductive paths of the plurality of power storage apparatuses, to turn on or off the plurality of power storage apparatuses.

3. The control method according to claim 1, wherein the controlling the switches includes controlling the switches of the plurality of power storage apparatuses to turn on or off to cause a total current value of charging or discharging by the plurality of power storage apparatuses to be constant.

4. A control apparatus for a plurality of power storage apparatuses connected in parallel to each other via respective switches, the control apparatus comprising one or more processors configured to control the switches,
wherein the is one or more processors are configured to,
in response to receiving an instruction to charge or discharge the plurality of power storage apparatuses, based on respective voltage values of the plurality of power storage apparatuses and respective resistance values of conductive paths of the plurality of power storage apparatuses, only turn on a switch of at least one of the plurality of power storage apparatuses having a conductive path with a smallest resistance value to start charging or discharging the at least one of the plurality of power storage apparatuses.

5. The control apparatus according to claim 4, wherein the one or more processors are configured to control the switches, based on the respective voltage values of the plurality of power storage apparatuses and the respective resistance values of the conductive paths of the plurality of power storage apparatuses, to turn on or off the plurality of power storage apparatuses.

6. The control apparatus according to claim 4, wherein the is one or more processors are configured to control the switches of the plurality of power storage apparatuses to turn on or off to cause a total current value of charging or discharging by the plurality of power storage apparatuses to be constant.

7. A power storage system, comprising:
a plurality of power storage apparatuses connected in parallel to each other via respective switches; and
a control apparatus configured to control the switches, wherein
the control apparatus is configured to, in response to receiving an instruction to charge or discharge the plurality of power storage apparatuses, based on respective voltage values of the plurality of power storage apparatuses and respective resistance values of conductive paths of the plurality of power storage apparatuses, only turn on a switch of at least one of the plurality of power storage apparatuses having a conductive path with a smallest resistance value to start charging or discharging the at least one of the plurality of power storage apparatuses.

8. The power storage system according to claim 7, wherein the control apparatus is configured to control the switches to cause charging or discharging current values of the plurality of power storage apparatuses to be substantially equal to each other.

9. The power storage system according to claim 7, wherein the control apparatus is configured to control the switches to reduce a total loss due to the respective resistance values of the conductive paths of the plurality of power storage apparatuses.

10. The power storage system according to claim 7, wherein the control apparatus is configured to control the switches, such that a total loss due to the respective resistance values of the conductive paths of the plurality of power storage apparatuses becomes equal to or less than a predetermined threshold.

11. The power storage system according to claim 7, wherein the control apparatus is configured to charge or discharge each of the plurality of power storage apparatuses and measure the respective resistance values of the conductive paths of the plurality of power storage apparatuses.

12. The power storage system according to claim 7, wherein
the control apparatus is a power control apparatus that is conductively connected to the plurality of power storage apparatuses in parallel.

13. The power storage system according to claim 12, wherein
the power control apparatus is configured to, in response to the plurality of the power storage apparatuses substantially satisfying equations (i) and (ii), control the switches to charge or discharge the at least one of the plurality of power storage apparatuses, the equation (i) is:

$$Vpcs = Vbat_1 - R_1*Ibat_1 = Vbat_2 - R_2*Ibat_2 = \ldots = Vbat_N - R_N*Ibat_N$$

the equation (ii) is:

$$Ipcs = Ibat_1 + Ibat_2 + \ldots + Ibat_N$$

wherein
n is any integer between 1 and N, N being a number of the plurality of the power storage apparatuses,
$Vbat_1$ to $Vbat_n$ are the respective voltage values of the plurality of power storage apparatuses,
$Ibat_1$ to $Ibat_n$ are respective current values of the plurality of the power storage apparatuses,
$R_1$ to $R_n$ are the respective resistance values of the conductive paths of the plurality of the power storage apparatuses,
Vpcs is a voltage value of the power control apparatus, and
Ipcs is a current value of the power control apparatus.

14. The power storage system according to claim 12, wherein
the power control apparatus is configured to, in response to the plurality of the power storage apparatuses substantially satisfying equations (i) and (ii), control the switches to charge or discharge the at least one of the plurality of power storage apparatuses,
the equation (i) is:

$$Vpcs = Vbat_1 - R_1*Ibat_1 = Vbat_2 - R_2*Ibat_2 = \ldots = Vbat_N - R_N*Ibat_N$$

the equation (ii) is:

$$Ipcs = Ibat_1 + Ibat_2 + \ldots + Ibat_N$$

wherein
n is any integer between 1 and N, N being a number of the plurality of the power storage apparatuses,
$Vbat_1$ to $Vbat_n$ are the respective voltage values of the plurality of power storage apparatuses,
$Ibat_1$ to $Ibat_n$ are respective current values of the plurality of the power storage apparatuses,
$R_1$ to $R_n$ are the respective resistance values of the conductive paths of the plurality of the power storage apparatuses,
Vpcs is a voltage value of the power control apparatus, and
Ipcs is a current value of the power control apparatus,
the power control apparatus is configured to, in response to the plurality of the power storage apparatuses substantially satisfying the equations (i) and (ii) and equation (iii), control the switches to charge or discharge the at least one of the plurality of power storage apparatuses,
the equation (iii) is:

$$Ibat_1 = Ibat_2 = \ldots = Ibat_n$$

15. The power storage system according to claim 12, wherein the power control apparatus is configured to, in response to the plurality of the power storage apparatuses substantially satisfying equations (i) and (ii), control the switches to charge or discharge the at least one of the plurality of power storage apparatuses, the equation (i) is:

$$Vpcs = Vbat_1 - R_1*Ibat_1 = Vbat_2 - R_2*Ibat_2 = \ldots = Vbat_n - R_n*Ibat_n \text{ equation} \quad (2)$$

the equation (ii) is:

$$Ipcs = Ibat_1 + Ibat_2 + \ldots + Ibat_n,$$

wherein
n is any integer between 1 and N, N being a number of the plurality of the power storage apparatuses,
$Vbat_1$ to $Vbat_n$ are the respective voltage values of the plurality of power storage apparatuses,
$Ibat_1$ to $Ibat_n$ are respective current values of the plurality of the power storage apparatuses,
$R_1$ to $R_n$ are the respective resistance values of the conductive paths of the plurality of the power storage apparatuses,
Vpcs is a voltage value of the power control apparatus, and
Ipcs is a current value of the power control apparatus,
the power control apparatus is configured to, in response to the plurality of the power storage apparatuses substantially satisfying the equations (i) and (ii) and polynomial (iv), control the switches to charge or discharge the at least one of the plurality of power storage apparatuses and to reduce a total loss due to the respective resistance values of the conductive paths of the plurality of power storage apparatuses, and
the polynomial (iv) is:

$$Ibat_1^2 R_1 + Ibat_2^2 R_2 + \ldots + Ibat_n^2 R_n.$$

16. The power storage system according to claim 7, wherein
the control apparatus is configured to control the switches, based on the respective voltage values of the plurality of power storage apparatuses and the respective resistance values of the conductive paths of the plurality of power storage apparatuses, to turn on or off the plurality of power storage apparatuses.

17. The power storage system according to claim 7, wherein the plurality of power storage apparatuses respectively includes the switches.

18. The power storage system according to claim 7, wherein the control apparatus is configured to control the switches of the plurality of power storage apparatuses to turn on or off to cause a total current value of charging or discharging by the plurality of power storage apparatuses to be constant.

* * * * *